US012810611B2

(12) United States Patent

Kadav et al.

(10) Patent No.: US 12,810,611 B2

(45) Date of Patent: Nov. 24, 2026

(54) COMPOSITIONAL REASONING OF GROUP ACTIVITY IN VIDEOS WITH KEYPOINT-ONLY MODALITY

(71) Applicant: NEC Laboratories America, Inc., Princeton, NJ (US)

(72) Inventors: Asim Kadav, Mountain View, CA (US); Farley Lai, Santa Clara, CA (US); Hans Peter Graf, South Amboy, NJ (US); Honglu Zhou, Highland Park, NJ (US)

(73) Assignee: NEC Corporation, Tokyo (JP)

( * ) Notice: Subject to any disclaimer, the term of this patent is extended or adjusted under 35 U.S.C. 154(b) by 325 days.

(21) Appl. No.: 17/960,370

(22) Filed: Oct. 5, 2022

(65) Prior Publication Data

US 2023/0148017 A1 May 11, 2023

Related U.S. Application Data

(60) Provisional application No. 63/276,753, filed on Nov. 8, 2021.

(51) Int. Cl.

| | |
|---|---|
| ***G06V 20/40*** | (2022.01) |
| ***G06V 10/77*** | (2022.01) |
| ***G06V 10/774*** | (2022.01) |
| ***G06V 10/82*** | (2022.01) |
| ***G06V 40/10*** | (2022.01) |

(52) U.S. Cl.

CPC .......... *G06V 20/41* (2022.01); *G06V 10/7715* (2022.01); *G06V 10/774* (2022.01); *G06V 20/46* (2022.01); *G06V 20/49* (2022.01); *G06V 40/10* (2022.01)

(58) Field of Classification Search

CPC .... G06V 20/41; G06V 20/49; G06V 10/7715; G06V 20/46; G06V 40/10; G06V 10/774

See application file for complete search history.

(56) References Cited

U.S. PATENT DOCUMENTS

2021/0295559 A1* 9/2021 Huang .................. H04N 23/90

OTHER PUBLICATIONS

Li, Shuaicheng, et al. "Groupformer: Group activity recognition with clustered spatial-temporal transformer." Proceedings of the IEEE/CVF International Conference on Computer Vision, Aug. 28, 2021. (Year: 2021).*

Wang, Wenhai, et al. "Pyramid vision transformer: A versatile backbone for dense prediction without convolutions." Proceedings of the IEEE/CVF international conference on computer vision, Aug. 11, 2021. (Year: 2021).*

(Continued)

*Primary Examiner* — Oneal R Mistry

*Assistant Examiner* — Nhut Huy Pham

(74) *Attorney, Agent, or Firm* — Vincent Duffy

(57) ABSTRACT

A method for compositional reasoning of group activity in videos with keypoint-only modality is presented. The method includes obtaining video frames from a video stream received from a plurality of video image capturing devices, extracting keypoints all of persons detected in the video frames to define keypoint data, tokenizing the keypoint data with time and segment information, clustering groups of keypoint persons in the video frames and passing the clustering groups through multi-scale prediction, and performing a prediction to provide a group activity prediction of a scene in the video frames.

8 Claims, 8 Drawing Sheets

(56) References Cited

OTHER PUBLICATIONS

Li, Shuaicheng, et al. "Groupformer: Group activity recognition with clustered spatial-temporal transformer." IEEE, Aug. 28, 2021 (Year: 2021).*

Wang, Wenhai, et al. "Pyramid vision transformer: A versatile backbone for dense prediction without convolutions." IEEE, Aug. 11, 2021 (Year: 2021).*

Li-Yunfan, et al. "Contrastive clustering." Proceedings of the AAAI conference on artificial intelligence, published May 18, 2021 (Year: 2021).*

Brasó, Guillem et al. "The center of attention: Center-keypoint grouping via attention for multi-person pose estimation." IEEE, published Oct. 11, 2021 (Year: 2021).*

Li et al. (Li, Shuaicheng, et al. "Groupformer: Group activity recognition with clustered spatial-temporal transformer." IEEE, published Aug. 28, 2021) (Year: 2021).*

Braso et al. (Brasó, Guillem et al. "The center of attention: Center-keypoint grouping via attention for multi-person pose estimation." IEEE, published Oct. 11, 2021) (Year: 2021).*

Wang et al. (Wang, Wenhai, et al. "Pyramid vision transformer: A versatile backbone for dense prediction without convolutions." IEEE, published Aug. 11, 2021) (Year: 2021).*

Li-Yunfan et al. (Li-Yunfan, et al. "Contrastive clustering." Proceedings of the AAAI conference on artificial intelligence, published May 18, 2021) (Year: 2021).*

Li, Shuaicheng, et al. "Groupformer: Group activity recognition with clustered spatial-temporal transformer." IEEE (Year: 2021).*

Wang, Wenhai, et al. "Pyramid vision transformer: A versatile backbone for dense prediction without convolutions." IEEE (Year: 2021).*

Li-Yunfan, et al. "Contrastive clustering." Proceedings of the AAAI conference on artificial intelligence (Year: 2021).*

Abkenar, A. B., Loke, S. W., Zaslavsky, A., & Rahayu, W. (Jan. 9, 2019). GroupSense: recognizing and understanding group physical activities using multi-device embedded sensing. ACM Transactions on Embedded Computing Systems (TECS), 17(6), 1-26.

Asano, Y., Patrick, M., Rupprecht, C., & Vedaldi, A. (Dec. 6, 2020). Labelling unlabelled videos from scratch with multi-modal self-supervision. Advances in Neural Information Processing Systems, 33, 4660-4671.

Azar, S. M., Atigh, M. G., Nickabadi, A., & Alahi, A. (Jun. 15, 2019). Convolutional relational machine for group activity recognition. In Proceedings of the IEEE/CVF Conference on Computer Vision and Pattern Recognition (pp. 7892-7901).

Ba, J. L., Kiros, J. R., & Hinton, G. E. (Jul. 21, 2016). Layer normalization. arXiv preprint arXiv:1607.06450.

Bagautdinov, T., Alahi, A., Fleuret, F., Fua, P., & Savarese, S. (Jul. 21, 2017). Social scene understanding: End-to-end multi-person action localization and collective activity recognition. In Proceedings of the IEEE conference on computer vision and pattern recognition (pp. 4315-4324).

Blomqvist, K., Chung, J. J., Ott, L., & Slegwart, R. (Jan. 19, 2022). Semi-automatic 3D Object Keypoint Annotation and Detection for the Masses. arXiv preprint arXiv:2201.07665.

Bottou, L. (Feb. 27, 2014). From machine learning to machine reasoning. Machine learning, 94(2), 133-149.

Caron, M., Misra, I., Mairal, J., Goyal, P., Bojanowski, P., & Joulin, A. (Dec. 6, 2020). Unsupervised learning of visual features by contrasting cluster assignments. Advances in Neural Information Processing Systems, 33, 9912-9924.

Carreira, J., & Zisserman, A. (Jul. 21, 2017). Quo vadis, action recognition? a new model and the kinetics dataset. In proceedings of the IEEE Conference on Computer Vision and Pattern Recognition (pp. 6299-6308).

Chen, B., Rouditchenko, A., Duarte, K., Kuehne, H., Thomas, S., Boggust, A., . . . & Chang, S. F. (Jun. 20, 2021). Multimodal clustering networks for self-supervised learning from unlabeled videos. In Proceedings of the IEEE/CVF International Conference on Computer Vision (pp. 8012-8021).

Cheng, Z., Qin, L., Huang, Q., Jiang, S., & Tian, Q. (Aug. 23, 2010). Group activity recognition by gaussian processes estimation. In 2010 20th International Conference on Pattern Recognition (pp. 3228-3231). IEEE.

Chen, J., Hao, H., Hong, H., & Kong, Y. (Jun. 13, 2020). Rit-18: A novel dataset for compositional group activity understanding. In Proceedings of the IEEE/CVF Conference on Computer Vision and Pattern Recognition Workshops (pp. 362-363).

Choi, J., Gao, C., Messou, J. C., & Huang, J. B. (Dec. 8, 2019). Why can't i dance in the mall? learning to mitigate scene bias in action recognition. Advances in Neural Information Processing Systems, 32.

Ball recognition and tracking in live volleyball game https://github.com/tprlab/vball (Sep. 21, 2022).

Mediapipe pose: Ml solution for high-fidelity body pose tracking from rgb video frames https://google.github.io/mediapipe/solutions/pose.html (Sep. 21, 2022).

Kirill Gavrilyuk et al., Actor-Transformers for Group Activity Recognition, 2020 IEEE/CVF Conference on Computer Vision and Pattern Recognition (CVPR), pp. 836-845, Jun. 13, 2020 [retrieved on Jan. 17, 2023] from <https://ieeexplore.ieee.org/abstract/document/9156959> 1-20 pp. 836-839; and figures 1-2.

Yi Huang et al., Learning Higher-order Object Interactions for Keypoint-based Video Understanding, pp. 1-11, Oct. 4, 2021 [retrieved on Jan. 17, 2023] from <https://isis-data.science.uva.nl/mettes/srvu-iccv21/Papers/14/KeyNet-final.pdf>1-20 pp. 4-7; and figure 4.

* cited by examiner

100

350

COMPOSITIONAL REASONING OF GROUP ACTIVITY IN VIDEOS WITH KEYPOINT-ONLY MODALITY

RELATED APPLICATION INFORMATION

This application claims priority to Provisional Application No. 63/276,753 filed on Nov. 8, 2021, the contents of which are incorporated herein by reference in their entirety.

BACKGROUND

Technical Field

The present invention relates to group activity recognition and, more particularly, to compositional reasoning of group activity in videos with keypoint-only modality.

Description of the Related Art

Group Activity Recognition (GAR) detects the activity collectively performed by a group of actors in a short video clip. GAR has widespread societal implications in a variety of domains including security, surveillance, kinesiology, sports analysis, robot-human interaction, and rehabilitation.

SUMMARY

A method for compositional reasoning of group activity in videos with keypoint-only modality is presented. The method includes obtaining video frames from a video stream received from a plurality of video image capturing devices, extracting keypoints all of persons detected in the video frames to define keypoint data, tokenizing the keypoint data with time and segment information, clustering groups of keypoint persons in the video frames and passing the clustering groups through multi-scale prediction, and performing a prediction to provide a group activity prediction of a scene in the video frames.

A non-transitory computer-readable storage medium comprising a computer-readable program for compositional reasoning of group activity in videos with keypoint-only modality is presented. The computer-readable program when executed on a computer causes the computer to perform the steps of obtaining video frames from a video stream received from a plurality of video image capturing devices, extracting keypoints all of persons detected in the video frames to define keypoint data, tokenizing the keypoint data with time and segment information, clustering groups of keypoint persons in the video frames and passing the clustering groups through multi-scale prediction, and performing a prediction to provide a group activity prediction of a scene in the video frames.

A system for compositional reasoning of group activity in videos with keypoint-only modality is presented. The system includes a memory and one or more processors in communication with the memory configured to obtain video frames from a video stream received from a plurality of video image capturing devices, extract keypoints all of persons detected in the video frames to define keypoint data, tokenize the keypoint data with time and segment information, cluster groups of keypoint persons in the video frames and pass the clustering groups through multi-scale prediction, and perform a prediction to provide a group activity prediction of a scene in the video frames.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
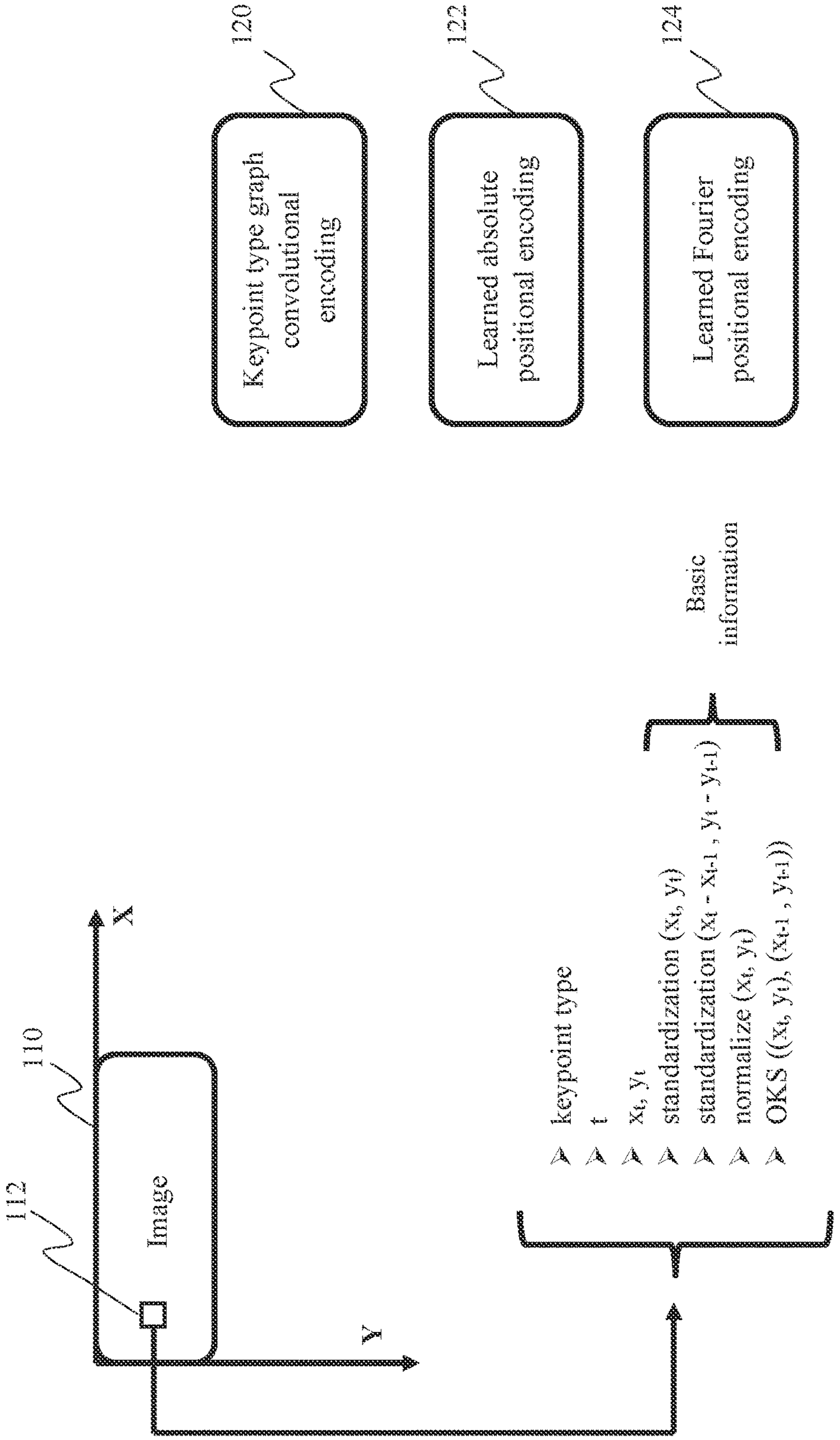
FIG. 1 is a block/flow diagram of how a keypoint is tokenized from a video, in accordance with embodiments of the present invention.

Group Activity Recognition (GAR) detects the activity collectively performed by a group of actors, which requires compositional reasoning of actors and objects. The exemplary methods approach the task by modeling the video as tokens that represent the multi-scale semantic concepts in the video. The exemplary embodiments propose COMPOSER, a Multiscale Transformer based architecture that performs attention-based reasoning over tokens at each scale and learns group activity compositionally. In addition, prior works suffer from scene biases with privacy and ethical concerns. The exemplary embodiments only use the keypoint modality which reduces scene biases and prevents acquiring detailed visual data that may include private or biased information of users. The exemplary embodiments improve the multiscale representations in COMPOSER by clustering the intermediate scale representations, while maintaining consistent cluster assignments between scales. Finally, the exemplary embodiments use techniques such as auxiliary prediction and data augmentations tailored to the keypoint signals to aid model training.

The present task requires addressing two challenges. First, GAR requires a compositional understanding of the scene. Because of the crowded scene, it is challenging to learn meaningful representations for GAR over the entire scene. Since group activity often includes sub-group(s) of actors and scene objects, the final action label depends on a compositional understanding of these entities. Second, GAR benefits from relational reasoning over scene elements to understand the relative importance of entities and their interactions. For example, in a volleyball game, persons around the ball performing the jumping action are more important than others standing in the scene.

Existing work has proposed to jointly learn the group activity with individual actions or person sub-groups for a compositional understanding of the group activity. Meanwhile, graph and transformer-based models have been proposed for relational reasoning over scene entities. However, these methods do not sufficiently make use of the multiscale scene elements in the GAR task by modeling over entities at either one semantic scale (e.g., person) or two scales (person and person group, or keypoint and person). More importantly, explicit multiscale modeling is neglected, lacking consistent compositional representations for the group action tasks. Furthermore, the majority of the prior GAR methods rely on the RGB modality, which causes the model more likely to have privacy and ethical issues when deployed in real-world applications. Finally, the RGB input hinders the model's robustness to changes in background, lighting conditions or textures, and often results in poor model generalizability due to scene biases.

The exemplary embodiments present COMPOSER that addresses compositional learning of entities in the video and relational reasoning about these entities. Inspired by how humans are particularly adept at representing objects in different granularities, meanwhile reasoning their interactions to turn sensory signals into a high-level knowledge, the exemplary embodiments approach GAR by modeling a video as tokens that represent the multi-scale semantic concepts in the video. Compared to the aforementioned prior works, the exemplary embodiments consider more fine-grained scene entities that are grouped into four scales. By combining the scales together with the Multiscale Transformer, COMPOSER provides attention-based reasoning over tokens at each scale, which makes higher-level understanding of the group activity possible. Moreover, COMPOSER uses only the keypoint modality. Using only the 2D (or 3D) keypoints as input, the method can prevent the sensor camera from acquiring detailed visual data that may include private or biased information of users. Keypoints also allow the model to focus on the action-specific cues, and help the model be more invariant to the scene biases. COMPOSER generalizes much better to testing data with different scene backgrounds.

COMPOSER learns consistent multiscale representations which boost the performance for GAR. This is achieved by contrastive clustering assignments of clips. Intuitively, a model can recognize the group activity using representations of entities at just one particular scale. Hence, the exemplary embodiments consider representations of the clip token learned across scales as representations of different views of the clip. Such perspective allows the exemplary methods to cluster clip representations learned at all scales while enforcing consistency between cluster assignments produced from different scales of the same clip. To enforce this consistency, a swapped prediction mechanism or component is used where the cluster assignment of a scale is predicted from the representation of another scale. However, distinct from related works, which use information from multiple augmentations or modalities for self-supervised learning from unlabeled images or videos, information from multiple scales is used for the task of group activity recognition. Contrasting clustering assignments enhance the intermediate representations and the overall performance. Finally, techniques such as auxiliary prediction at each scale and data augmentation methods such as Actor Dropout are used to aid training.

COMPOSER can distill and convey high-level semantic knowledge from the elementary elements of the human-centered videos. The exemplary embodiments learn contrastive clustering assignment to improve the multiscale representations. By maintaining a consistent cluster assignment across the multiple scales of the same clip, an agreement between scales on the high-level knowledge learned can be promoted to optimize the representations across scales.

The exemplary embodiments use only the keypoint modality that allows COMPOSER to address the privacy and ethical concerns and to be robust to changes in background, with auxiliary prediction and data augmentation methods tailored to learning group activity from the keypoint modality.

Regarding tokenizing a video as hierarchical semantic entities, a video is modeled as semantic tokens that allow the method to easily adapt to understanding any videos with multi-actor multi-object interactions.

Regarding person keypoint, a person keypoint token, $$k_p^j$$

$\in \mathbb{R}^d$ is defined that represents a keypoint joint j(j=1, . . . , j') of person p (p=1, . . . , p') in all timestamps, where j' is the number of joint types and p' is the number of actors. The initial d-dimensional person keypoint token is learned by encoding the numerical coordinates (in the image space) of a certain keypoint track. The procedure of encoding includes coordinate embedding, time positional embedding, keypoint type embedding, and OKS-based feature embedding to mitigate the issue of noisy estimated keypoints.

Regarding a person, a person token is defined as $p_p \in \mathbb{R}^d$, initially obtained by aggregating the standardized keypoint coordinates of person p over time through concatenation and FFN-based transformation.

Regarding person-to-person interaction, modeling the person-to-person interactions is important for GAR. Unlike existing works that usually consider an interaction as an edge connecting two person nodes and learn a scalar to depict its importance, the exemplary embodiments model interaction as nodes (tokens) to allow for the modeling of complex higher-order interactions. The person-to-person interaction token is defined as $i_i \in \mathbb{R}^d$ where i=1, . . . p'×(p'−1) (bi-directed interactions). Initial representation of the interaction between person p and q is learned from concatenation of $p_p$ and $p_q$, followed by FFN-based transformation.

Regarding a person group, the group token $g_g \in \mathbb{R}^d$ is defined where g=1, . . . , g' for videos where sub-groups are often separable. g' denotes the number of subgroups in the video. Given the person-to-group mapping which can be obtained through various mechanisms (e.g., heuristics, k-means, etc.), representation of a group is an aggregate over representations of persons in the group similarly through concatenation and FFN.

Regarding a clip, the special [CLS] token ($\in \mathbb{R}^d$) is a learnable embedding vector and is considered as the clip representation. CLS stands for classification and is often used in transformers to "summarize" the task-related representative information from all tokens in the input sequence.

Regarding an object token, scene objects can play an important role in videos where human(s) interact with object(s). For instance, in a volleyball game where one person is spiking and multiple nearby actors are all jumping with arms up, it can be difficult to tell which person is the key person with information of just the person keypoints due to their similar poses. The ball keypoints can help to distinguish the key person. Object keypoints can be used to represent an object in the scene with similar benefits of person keypoints (e.g., to boost model robustness). Object keypoint detection benefits downstream tasks such as human action recognition, object detection, tracking, etc. Thus, object keypoints are used to represent each object for GAR. The exemplary embodiments denote object token $e_e \in \mathbb{R}^d$ where e=1, . . . , e' and e' is the maximal number of objects a video might have. Similar to person tokens, the initial object tokens are learned from aggregating the coordinate-represented object keypoints.

The Multiscale Transformer takes a sequence of multiple-scale tokens as input and refines representations of these tokens.

Specifically, tokens of the four scales are:

$$\text{Scale 1: } \{[CLS], e_1, \ldots, e'_e, k_1^1, \ldots, k_{p'}^{j'}\}, \tag{1}$$

$$\text{Scale 2: } \{[CLS], e_1, \ldots, e'_e, p_1, \ldots, p_{p'}\},$$

$$\text{Scale 3: } \{[CLS], e_1, \ldots, e'_e, i_1, \ldots, i_{p'\times(p'-1)}\},$$

$$\text{Scale 4: } \{[CLS], e_1, \ldots, e'_e, g_1, \ldots, g_{g'}\}.$$

The exemplary embodiments utilize a transformer encoder at each scale to perform relational reasoning of tokens in that scale.

Figure 3A:
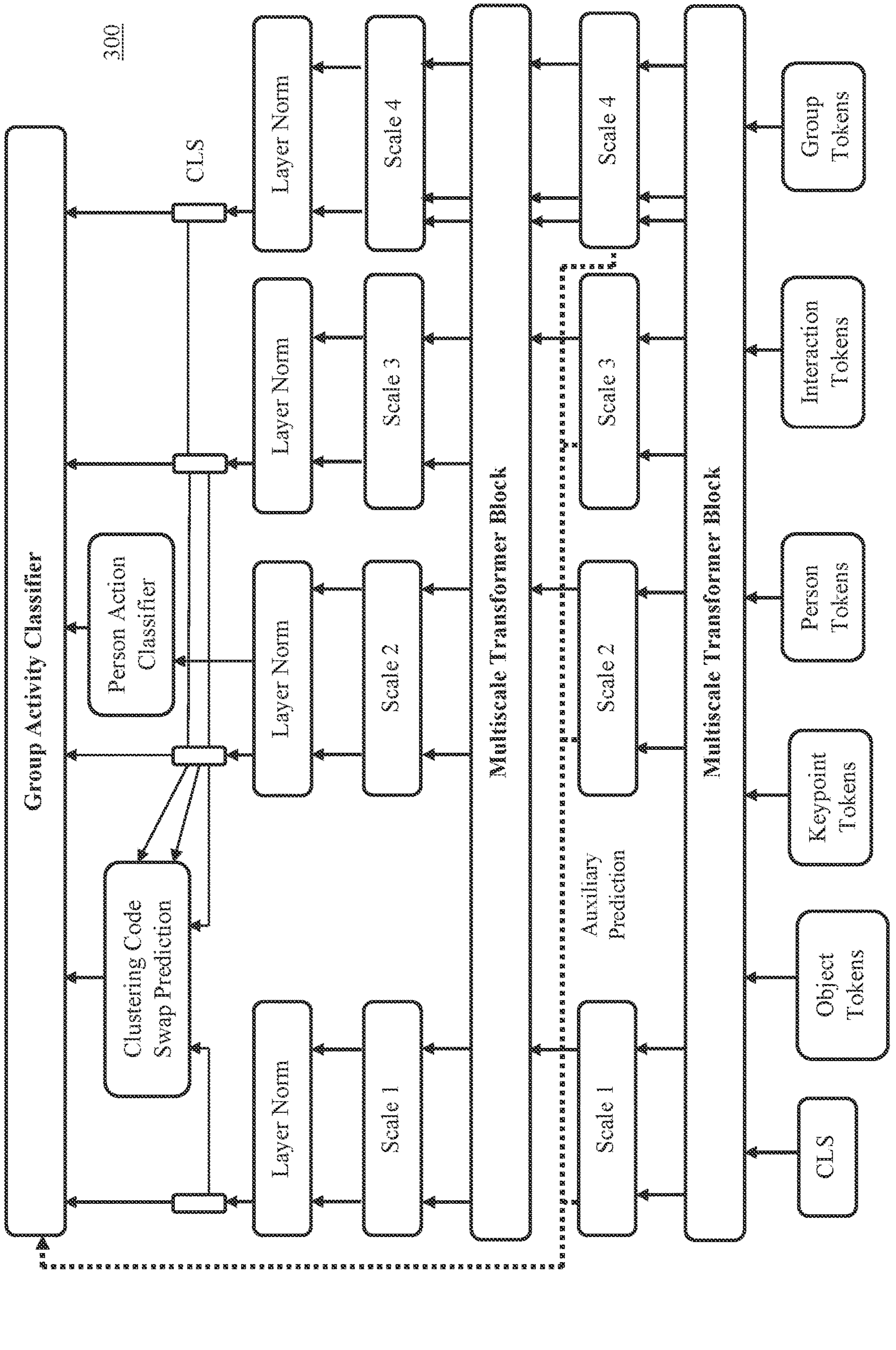
FIG. 3A is a block/flow diagram of an exemplary architecture for compositional reasoning of group activity in videos with keypoint-only modality (COMPOSER), in accordance with embodiments of the present invention.
Figure 3B:
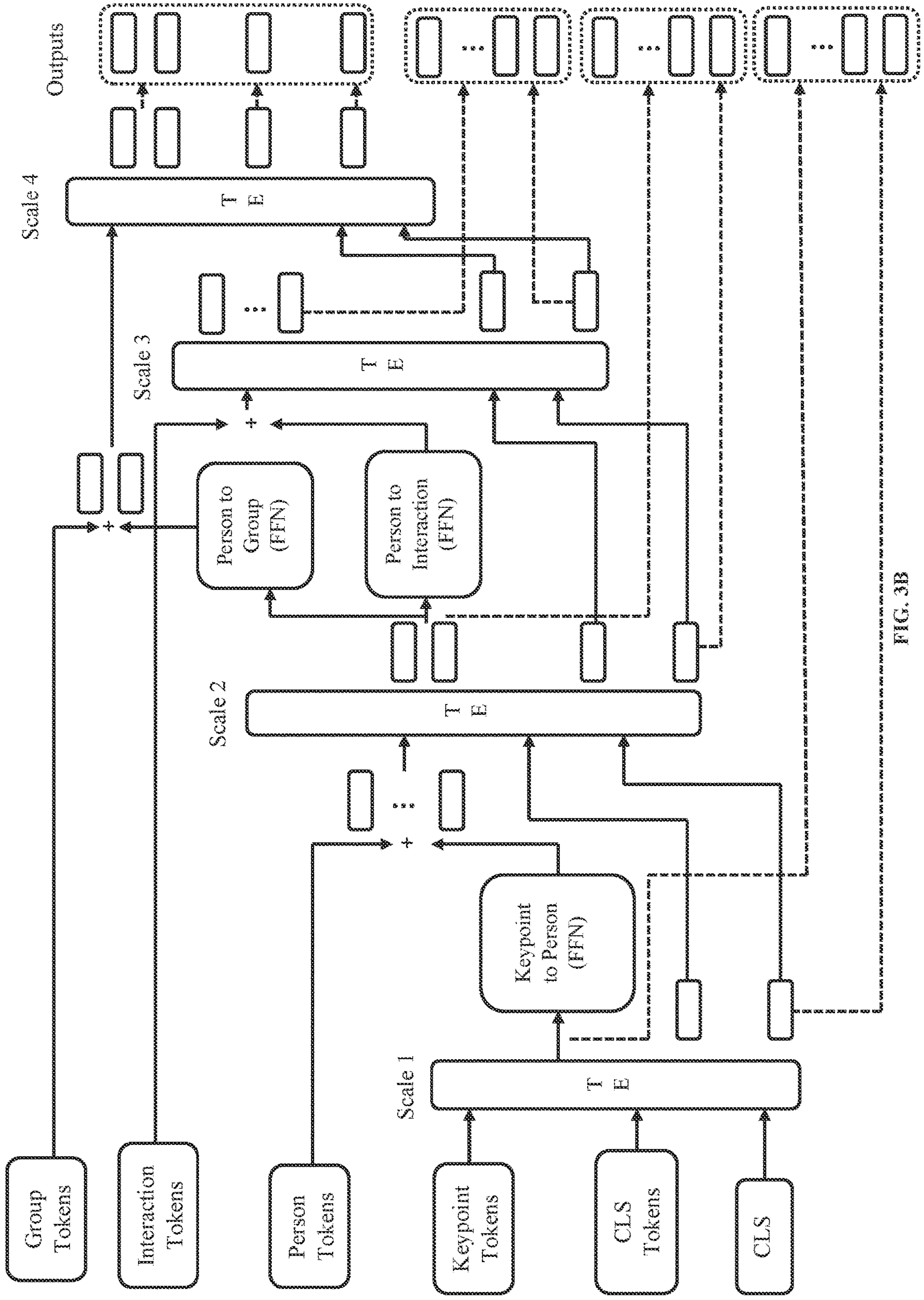
FIG. 3B is a block/flow diagram of an exemplary Multiscale Transformer, in accordance with embodiments of the present invention.

Hierarchical representations of tokens are maintained in an elaborately designed Multiscale Transformer block (FIG. 3B). In the Multiscale Transformer block, operations in the four scales are the same (but with different parameters) to maintain simplicity. Specifically, given a sequence of tokens of scale s (Eq. 1), the transformer encoder outputs refined representations of these tokens. Then, concatenation and FFN are used to aggregate refined representations of actor-related tokens, to form representations of actor-related tokens in the subsequent coarser scale s+1. Such learned representations are summed with their initial representations (input to the Multiscale Transformer) (i.e., Skip Connection). The resulting actor-related tokens, as well as scale s updated [CLS] token and object token(s) form the input sequence of the transformer encoder in the scale s+1.

COMPOSER uses the initial representations of the multi-scale semantic tokens as input and utilizes multiple blocks of Multiscale Transformer to perform relational reasoning over these tokens. With refined token representations, COMPOSER jointly learns group activity, individual actions and contrastive clustering of clips.

Regarding contrastive clustering for scale agreement, the exemplary embodiments consider the clip tokens learned at different scales as representations of different views of the clip instance. Then, the exemplary embodiments cluster clip representations learned in all scales while enforcing consistency between cluster assignments produced from different scales of the clip. This can act as regularization of the embedding space during training. To enforce consistency, a swapped prediction mechanism or component is used where the cluster assignment of a scale is predicted from the representation of another scale. COMPOSER jointly learns GAR and the swapped prediction task to capture an agreement of the common semantic information hidden across the scales.

Suppose $v_{n,s} \in \mathbb{R}^d$ represents the learned representation of clip n in scale s, where $s \in \{1, 2, 3, 4\}$. The exemplary embodiments first project the representation to the unit sphere. The exemplary embodiments then compute a code (i.e., cluster assignment) $q_{n,s} \in \mathbb{R}^K$ by mapping $v_{n,s}$ to a set of K trainable prototype vectors, $\{c_1, \ldots, c_K\}$. The exemplary embodiments denote by $C \in \mathbb{R}^d$ the matrix whose rows are the $c_1, \ldots, c_K$.

Regarding swapped prediction, supposes and w denote two different scales from the four representation scales. The swapped prediction problem aims to predict the code $q_{n,s}$ from $v_{n,w}$, and $q_{n,w}$ from $v_{n,s}$ With the following loss function:

$$\mathcal{L}_{swap}(v_{n,w}, v_{n,s}) = \ell(v_{n,w}, q_{n,s}) + \ell(v_{n,s}, q_{n,w}) \tag{2}$$

where $\ell(v_{n,w}, q_{n,s})$ measures the fit between $v_{n,w}$ and $q_{n,s}$, $\ell(v_{n,w}, q_{n,s})$ is the cross entropy loss between $q_{n,s}$ and the probability obtained by taking a softmax of the dot products of $v_{n,w}$ and prototypes in C:

$$\ell(v_{n,w}, q_{n,s}) = -\sum_{k=1}^{K} q_{n,s}^{(k)} \log \frac{\exp\left(\frac{1}{\tau} v_{n,w} c_k^T\right)}{\sum_{k'=1}^{K} \exp\left(\frac{1}{\tau} v_{n,w} c_{k'}^T\right)} \tag{3}$$

where τ is a temperature parameter. The total loss of the swapped prediction problem is taking Eq. (2) computed over all pairs of scales and all N clips, $$\mathcal{L}_{cluster} = \frac{1}{N}\sum_{n=1}^{N}\left(\sum_{w,s\in\{1,2,3,4\}\&w\neq s} \mathcal{L}_{swap}(v_{n,w}, v_{n,s})\right) \tag{4}$$

Regarding online clustering, this step produces the cluster assignments using the learned prototypes C and the learned clip representations only within a batch, $V \in \mathbb{R}^{B\times d}$ where B denotes the batch size. The exemplary embodiments perform the clustering in an online fashion for faster training. Specifically, online clustering yields the codes $Q \in \mathbb{R}^{B\times K}$. The exemplary embodiments compute codes Q such that all examples in a batch are equally partitioned by the prototypes (which prevents the trivial solution where every clip has the same code). Q is optimized to maximize the similarity between the learned clip representations and the prototypes, $$\max_{Q\in\mathcal{Q}} Tr(QCV^T) + \varepsilon H(Q), \tag{5}$$

$$\mathcal{Q} = \left\{Q \in \mathbb{R}_+^{B\times K} \middle| 1_B Q = \frac{1}{K} 1_K, Q 1_K^T = \frac{1}{B} 1_B^T\right\}$$

where the trace Tr is the sum of the elements on the main diagonal, H is the entropy function, and ε is a parameter that controls the smoothness of the $1_K \in \mathbb{R}^K$ and $1_B \in \mathbb{R}^B$ are a vector of ones to enforce the equipartition constraint. The continuous solution Q* of Eq. (5) is computed with the iterative Sinkhorn-Knopp algorithm.

Regarding data augmentation for keypoint modality, the following data augmentations are used to aid training and improve generalization ability of the model learned from the keypoint modality.

Actor Dropout is performed by removing a random actor in a random frame that masks agents with probabilities to predict agent behaviors for autonomous driving. The exemplary embodiments remove actors by replacing the representation of the actor with a zero vector.

Horizontal Flip is often used by existing GAR methods, which is performed on the video frame level. This augmentation causes the pose of each person and positions of (left and right) sub-groups flipped horizontally. The exemplary embodiments add a small random perturbation on each flipped keypoint.

Horizontal Move means that the exemplary methods horizontally move all keypoints in the clip by a certain number of pixel locations, which is randomly determined per video and bounded by a pre-defined number (i.e., 10). Similarly, afterwards a small random perturbation is applied on each keypoint.

Vertical Move is done similar to the Horizontal Move, except the exemplary methods move the keypoints in the vertical direction. Novel practices like Actor Dropout, Horizontal/Vertical Move and random perturbations help the model to perform GAR from noisy estimated keypoints.

Regarding auxiliary prediction and multitask learning, the exemplary embodiments take the learned representation of the clip at each scale of each Multiscale Transformer block and perform auxiliary group activity predictions (FIG. 3A). Specifically, each of the clip representations learned at each scale of each block is sent as input to the group activity classifier to produce one GAR result. In addition, person representation from the last Multiscale Transformer block is the input to a person action classifier. Meanwhile, the loss of the swapped prediction problem is computed given the learned representations of the clip of all 4 scales from the last Multiscale Transformer block. The total loss is:

$$\mathcal{L}_{total} = \sum_{m=1}^{M-1} \mathcal{L}_{groupAux} + \lambda(\mathcal{L}_{groupLast} + \mathcal{L}_{person} + \mathcal{L}_{cluster}) \quad (6)$$

where $\mathcal{L}$ groupAux represents the loss from Auxiliary Prediction incurred by clip representations at different scales and early blocks of the Multiscale Transformer, $\mathcal{L}$ groupLast is from the last Multiscale Transformer block, $\mathcal{L}$ person is the person action classification loss, and $\mathcal{L}$ cluster is the contrastive clustering loss (Eq. 4). m denotes the index of the Multiscale Transformer block, M is the total number of the Multiscale Transformer blocks, and λ is a hyper-parameter that weights the importance of predictions from the last block. For metric evaluation, the exemplary embodiments use the clip token from the last scale in the last Multiscale Transformer as input to the group activity classifier.

FIG. 1 is a block/flow diagram 100 of how a keypoint is tokenized from a video, in accordance with embodiments of the present invention.

An image 110 captured from a video camera includes a plurality of actors. For simplicity, one actor 112 is shown. Basic information is extracted from the image 110. The basic information can be processed by keypoint type graph convolutional encoding 120, learned absolute positional encoding 122, and learned Fourier positional encoding 124.

Figure 2A:
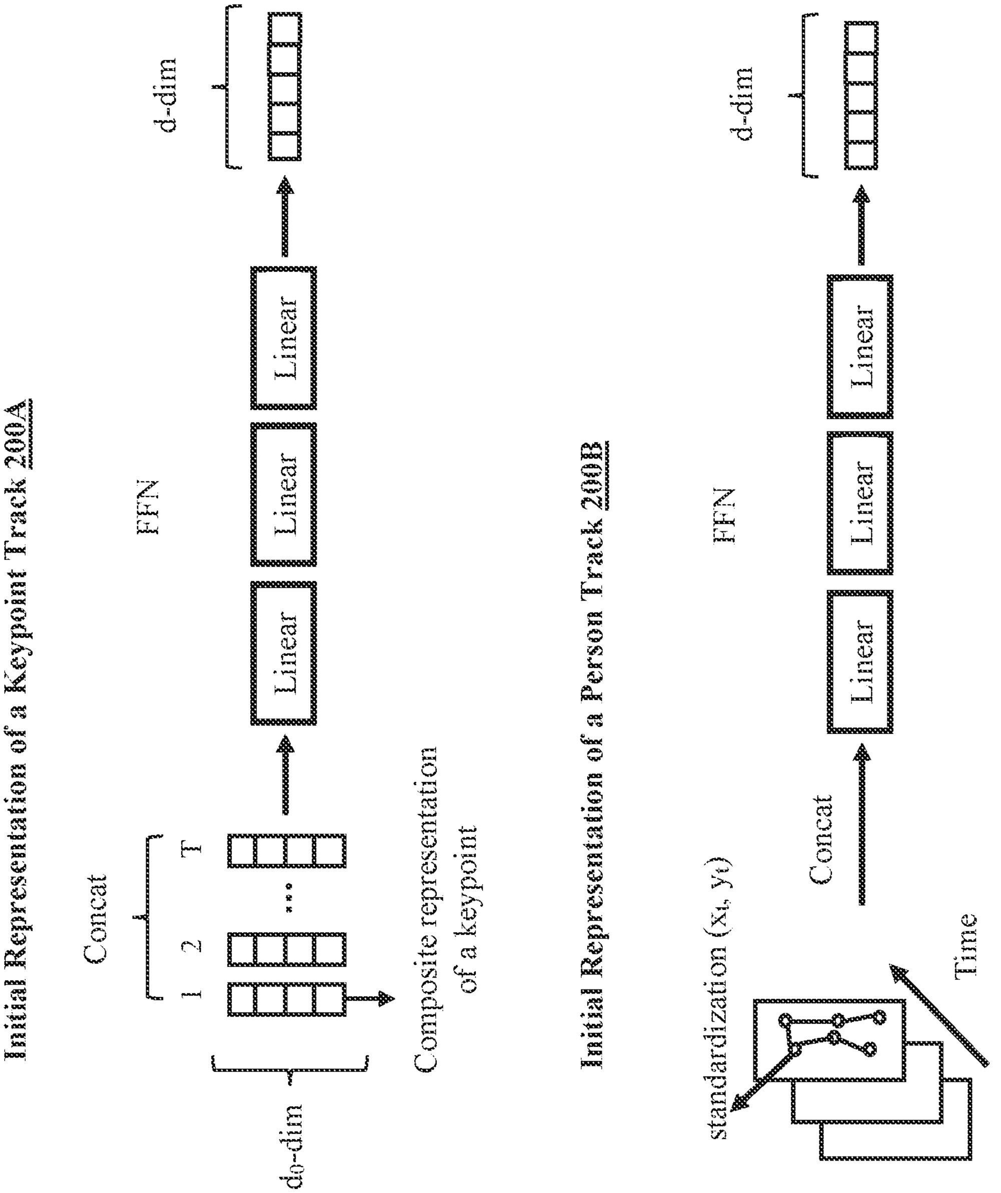
FIGS. 2A-2B are block/flow diagrams of obtaining immediate representation for learning, in accordance with embodiments of the present invention.
Figure 2B:
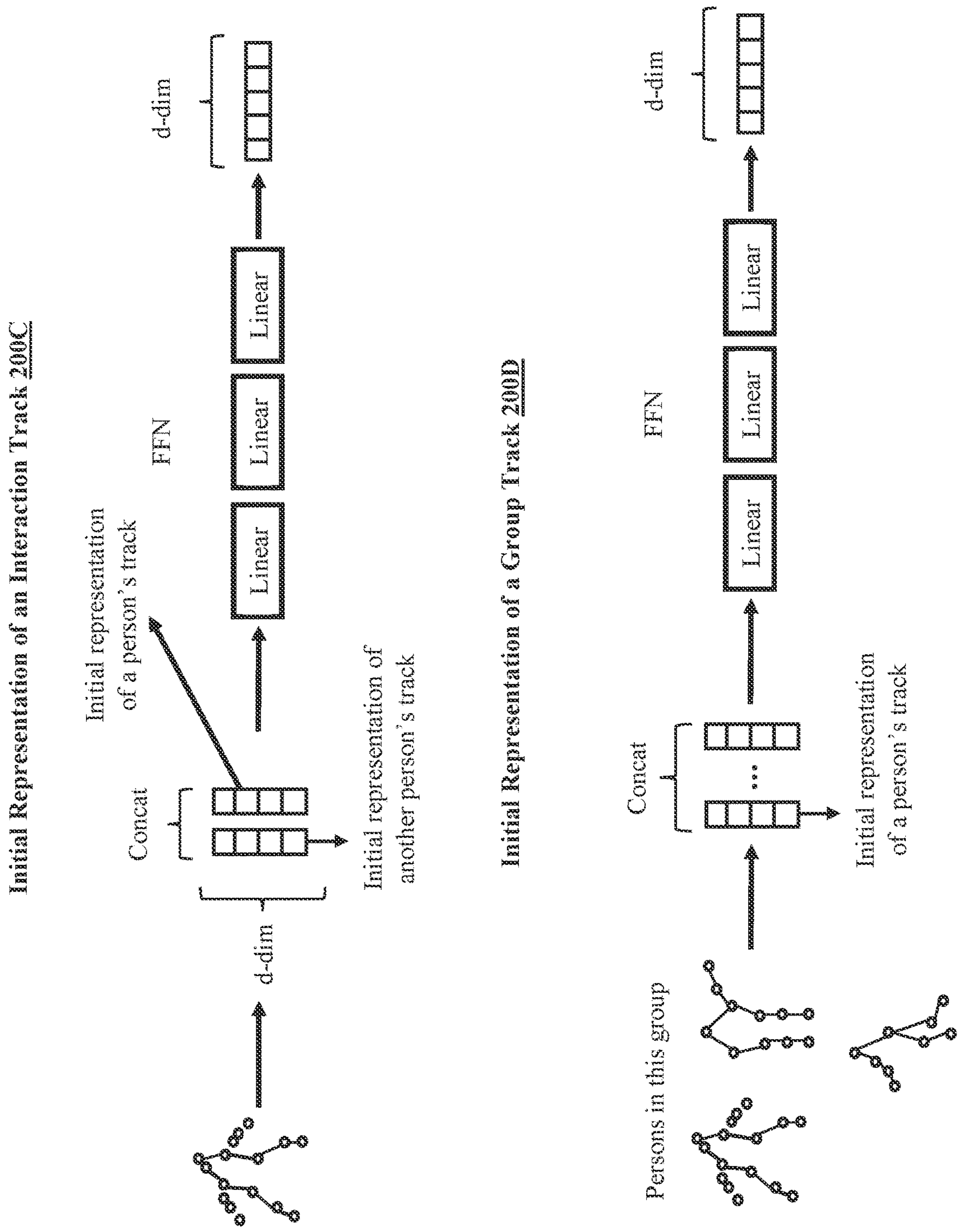

FIGS. 2A-2B are block/flow diagrams of obtaining immediate representation for learning, in accordance with embodiments of the present invention.

Initial representation of a keypoint track 200A is shown.

Initial representation of a person track 200B is shown.

Initial representation of an interaction track 200C is shown.

Initial representation of a group track 200D is shown.

FIG. 3A is a block/flow diagram of an exemplary architecture for compositional reasoning of group activity in videos with keypoint-only modality, in accordance with embodiments of the present invention.

COMPOSER 300 illustrates the tokens processed by the multiscale transformer blocks and the scales. The data is fed to a clustering code swap prediction component and a person action classifier. The data is finally fed into the group activity classifier.

Given tokens that represent the multiscale semantic concepts in the human-centered video, COMPOSER 300 jointly learns group activity, individual actions and contrastive clustering assignments of clips. Auxiliary predictions are enforced to aid training.

COMPOSER 300 exploits a contrastive clustering objective to learn consistent multiscale representations for GAR. This is achieved by clustering clip representations learned at all scales. The clustering objective encourages an "agreement" between scales on the high-level knowledge learned ('Pull Close' representations of the same clip). Contrastive learning is performed on the clusters, which also helps the model to discriminate between clips with different semantic characteristics ('Pull Close' representations of the semantically similar clips and 'Push Apart' those that are semantically different).

FIG. 3B is a block/flow diagram of an exemplary multiscale transformer, in accordance with embodiments of the present invention.

The multiscale transformer 350 is fed the tokens as inputs and employs four transformer encoders (TEs) to process the data through four scales.

Multiscale Transformer 350 performs relational reasoning with four transformer encoders to operate self-attention on tokens of each scale, while stringing tokens of the four scales together with FFNs and skip connections to learn hierarchical representations that make a high-level understanding of group activity possible.

Figure 4:
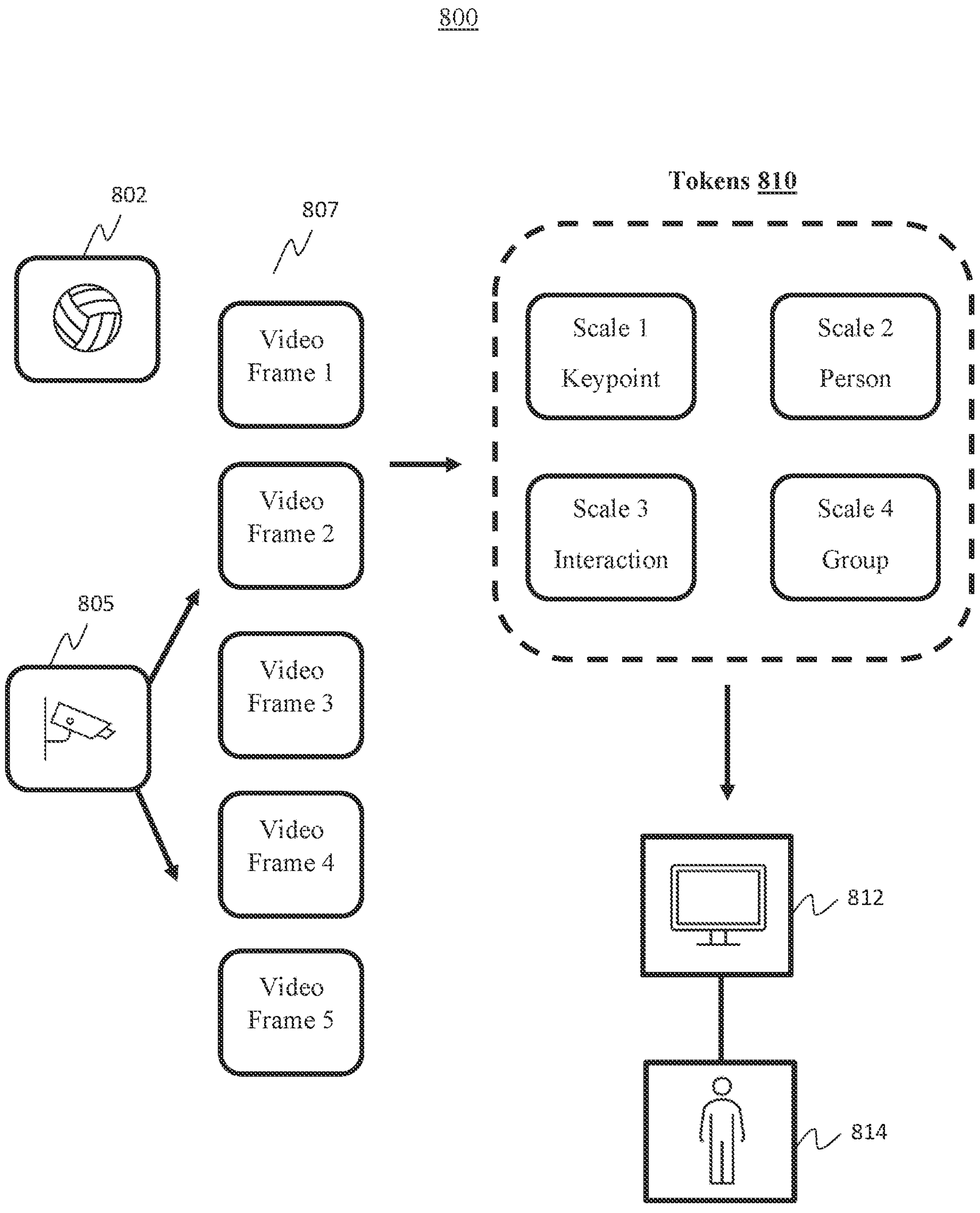
FIG. 4 is an exemplary practical application for compositional reasoning of group activity in videos with keypoint-only modality, in accordance with embodiments of the present invention.

FIG. 4 is an exemplary practical application 800 for compositional reasoning of group activity in videos with keypoint-only modality, in accordance with embodiments of the present invention.

In one practical example 800, in a volleyball scenario 802, a video capturing device 805 captures video frames 807. Keypoints all of persons detected in the video frames 807 are extracted to define keypoint data and the keypoint data is tokenized 810 with time and segment information. The tokenized data 810 can be displayed on a display screen 812 and analyzed by a user 814.

COMPOSER uses the Multiscale Transformer to learn compositional reasoning at different scales for group activity recognition. The exemplary embodiments also improve the intermediate representations using contrastive clustering, auxiliary prediction, and data augmentation techniques.

Figure 5:
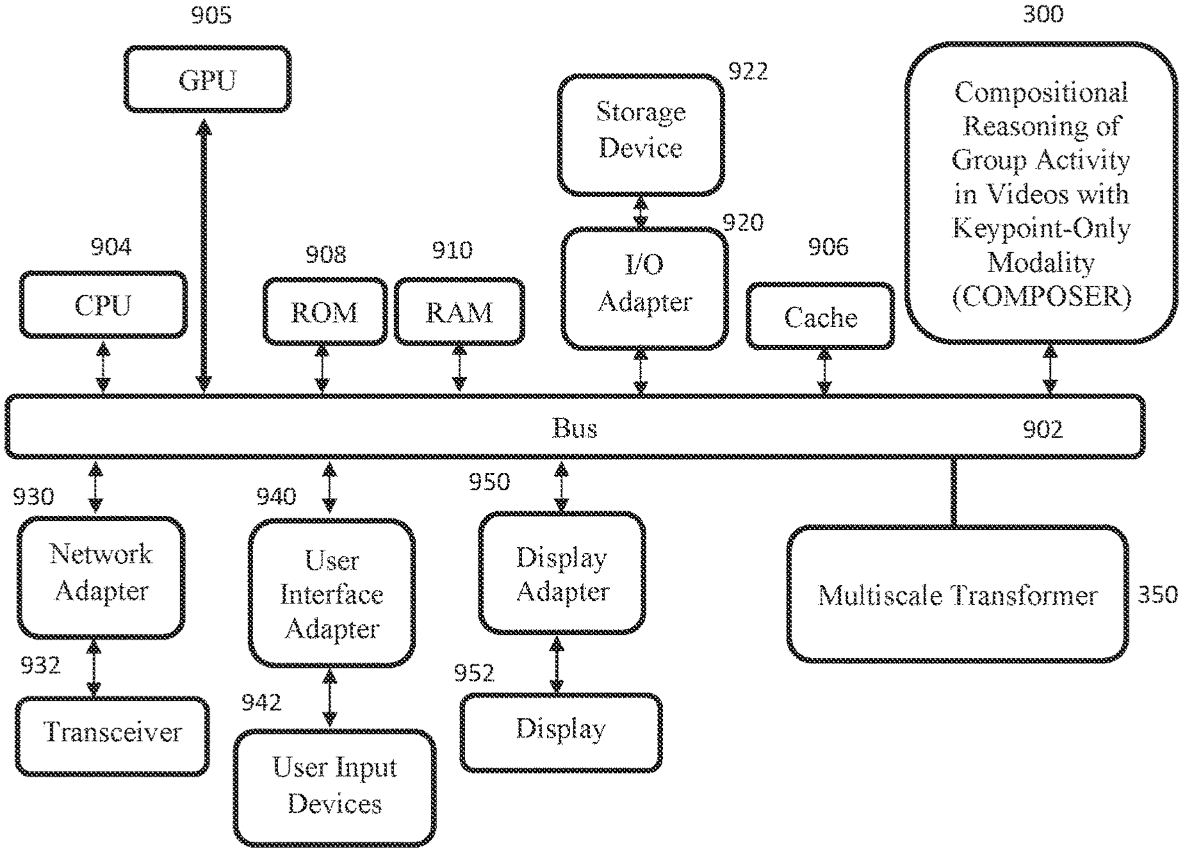
FIG. 5 is an exemplary processing system for compositional reasoning of group activity in videos with keypoint-only modality, in accordance with embodiments of the present invention.

FIG. 5 is an exemplary processing system for compositional reasoning of group activity in videos with keypoint-only modality, in accordance with embodiments of the present invention.

The processing system includes at least one processor (CPU) 904 operatively coupled to other components via a system bus 902. A Graphical Processing Unit (GPU) 905, a cache 906, a Read Only Memory (ROM) 908, a Random Access Memory (RAM) 910, an Input/Output (I/O) adapter 920, a network adapter 930, a user interface adapter 940, and a display adapter 950, are operatively coupled to the system bus 902. Additionally, the Compositional Reasoning of Group Activity in Videos with Keypoint-Only Modality (COMPOSER 300) can employ a Multiscale Transformer 350.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 6:
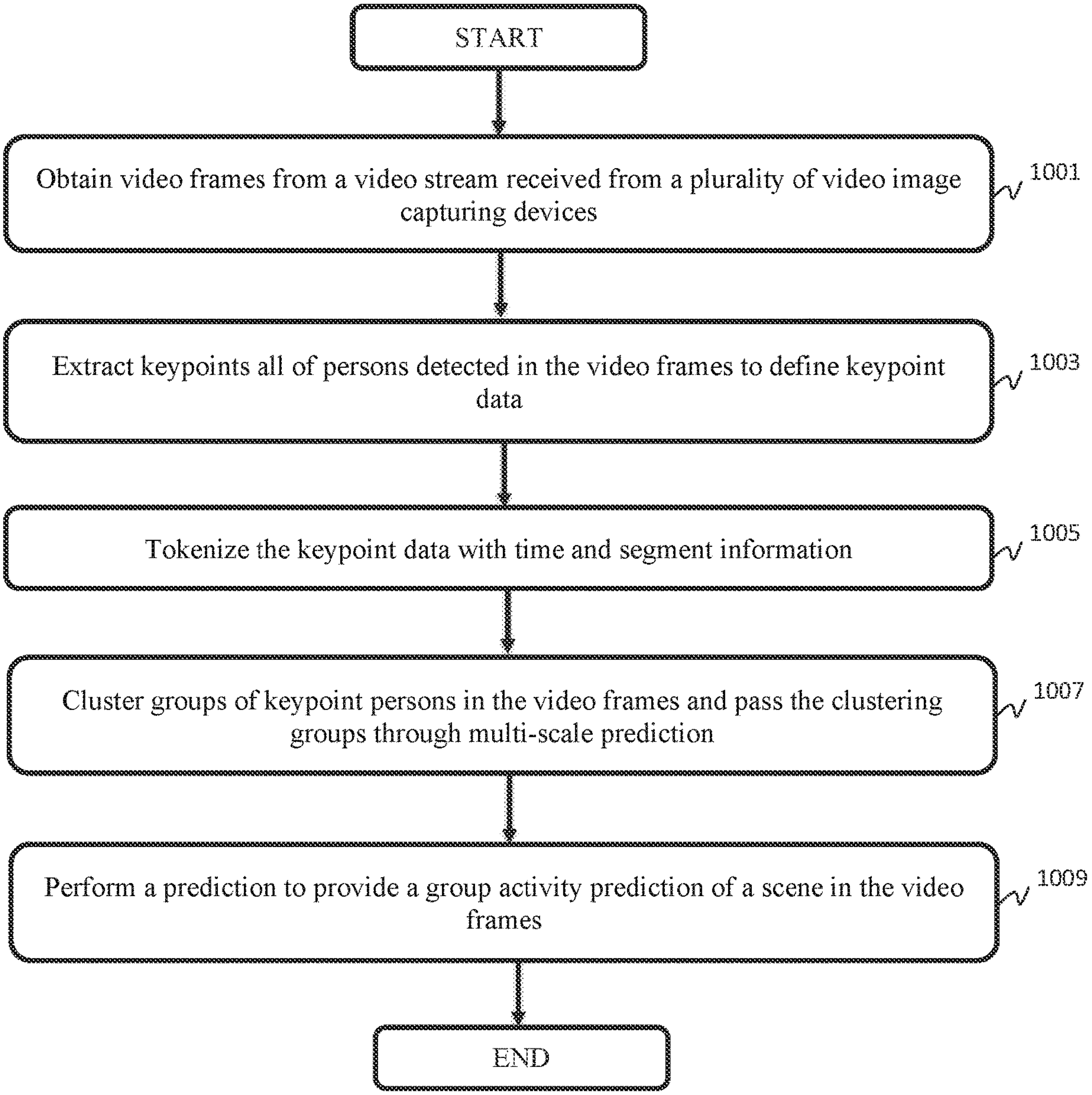
FIG. 6 is a block/flow diagram of an exemplary method for compositional reasoning of group activity in videos with keypoint-only modality, in accordance with embodiments of the present invention.

FIG. 6 is a block/flow diagram of an exemplary method for compositional reasoning of group activity in videos with keypoint-only modality, in accordance with embodiments of the present invention.

At block 1001, obtain video frames from a video stream received from a plurality of video image capturing devices.

At block 1003, extract keypoints all of persons detected in the video frames to define keypoint data.

At block 1005, tokenize the keypoint data with time and segment information.

At block 1007, cluster groups of keypoint persons in the video frames and pass the clustering groups through multi-scale prediction.

At block 1009, perform a prediction to provide a group activity prediction of a scene in the video frames.

In conclusion, the exemplary COMPOSER architecture approaches GAR problems by decomposing the video scene into a series of semantic tokens in multiple scales. A stack of Multiscale Transformer blocks then performs attention-based relational reasoning over tokens of each scale. In addition, the exemplary embodiments consider the scales as different views of the same clip instance. By maintaining consistent cluster assignments between multiple scales of the same clip, scale interactions are promoted and regulated. The exemplary embodiments use just the keypoint modality, because 2D keypoints are more light-weight and invariant to the scene biases, unlike RGB or Optical Flow based image features. COMPOSER considers the compositional and structured nature of the group activity recognition task. The exemplary embodiments show that contrastive clustering assignment imposes constraints that help guide the network towards compositional understanding of human-centered video scenes. The inventive features include at least a hierarchical multi-scale transformer model that learns over keypoint data and builds increasingly higher-level features at each hierarchy, contrastive clustering to encourage scale agreement, and an actor dropout to regularize learning from multiple actors in scene without overfitting. Therefore, COMPOSER uses keypoint only modality for GAR by modeling a video as tokens that represent the multiscale semantic concepts in the video, which include keypoint, person, person-to-person interaction, person group, object if present, and the clip. Four scales are formed by grouping actor-related tokens according to their semantic hierarchy. Representations of tokens in coarser scales are learned and aggregated from tokens of the finer scales. COMPOSER facilitates compositional reasoning of group activity in videos.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from another computing device or can be received indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, RAM, ROM, an Erasable Programmable Read-Only Memory (EPROM or Flash memory), an optical fiber, a portable CD-ROM, an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for compositional reasoning of group activity in videos with keypoint-only modality, the method comprising:

obtaining video frames from a video stream received from a plurality of video image capturing devices;

extracting keypoints all of persons detected in the video frames to define keypoint data;

tokenizing the keypoint data with time and segment information, wherein tokenizing includes defining a person keypoint token, a person token, a person-to-person interaction token, a group token, a classification (CLS) token, and an object keypoint token and the tokens are fed into a multiscale transformer to perform relational reasoning with four transformer encoders, wherein each of the four transformer encoders represents a scale to provide attention-based reasoning over the tokens at each scale;

clustering groups of keypoint persons in the video frames using contrastive learning and passing the clustering groups through multi-scale prediction, the scales including different granularities of the video frames, wherein a cluster assignment of each scale is predicted, by a swapped prediction component, from a representation of another scale to capture an agreement of common semantic information hidden across the scales; and performing a prediction to provide a group activity prediction of a scene in the video frames.

2. The method of claim 1, wherein data augmentation is employed to aid training, the data augmentation includes performing actor dropout, horizontal flip, horizontal move, and vertical move.

3. The method of claim 2, wherein auxiliary group activity predictions are performed by sending as input to a group activity classifier each clip representation learned at each scale.

4. A non-transitory computer-readable storage medium comprising a computer-readable program for compositional reasoning of group activity in videos with keypoint-only modality, wherein the computer-readable program when executed on a computer causes the computer to perform the steps of:

obtaining video frames from a video stream received from a plurality of video image capturing devices;

extracting keypoints all of persons detected in the video frames to define keypoint data;

tokenizing the keypoint data with time and segment information, wherein tokenizing includes defining a person keypoint token, a person token, a person-to-person interaction token, a group token, a classification (CLS) token, and an object keypoint token and the tokens are fed into a multiscale transformer to perform relational reasoning with four transformer encoders, wherein each of the four transformer encoders represents a scale to provide attention-based reasoning over the tokens at each scale;

clustering groups of keypoint persons in the video frames using contrastive learning, and passing the clustering groups through multi-scale prediction, the scales including different granularities of the video frames, wherein a cluster assignment of each scale is predicted, by a swapped prediction component, from a representation of another scale to capture an agreement of common semantic information hidden across the scales; and performing a prediction to provide a group activity prediction of a scene in the video frames.

5. The non-transitory computer-readable storage medium of claim 4, wherein data augmentation is employed to aid training, the data augmentation includes performing actor dropout, horizontal flip, horizontal move, and vertical move.

6. The non-transitory computer-readable storage medium of claim 5, wherein auxiliary group activity predictions are performed by sending as input to a group activity classifier each clip representation learned at each scale.

7. A system for compositional reasoning of group activity in videos with keypoint-only modality, the system comprising:

a memory; and one or more processors in communication with the memory configured to:

obtain video frames from a video stream received from a plurality of video image capturing devices;

extract keypoints all of persons detected in the video frames to define keypoint data;

tokenize the keypoint data with time and segment information, wherein tokenized keypoint data includes defining a person keypoint token, a person token, a person-to-person interaction token, a group token, a classification (CLS) token, and an object keypoint token and the tokens are fed into a multiscale transformer to perform relational reasoning with four transformer encoders, wherein each of the four transformer encoders represents a scale to provide attention-based reasoning over the tokens at each scale;

cluster groups of keypoint persons in the video frames using contrastive learning and pass the clustering groups through multi-scale prediction, the scales including different granularities of the video frames, wherein a cluster assignment of each scale is predicted by a swapped prediction component, from a representation of another scale to capture an agreement of common semantic information hidden across the scales; and perform a prediction to provide a group activity prediction of a scene in the video frames.

8. The system of claim 7, wherein data augmentation is employed to aid training, the data augmentation includes performing actor dropout, horizontal flip, horizontal move, and vertical move; and wherein auxiliary group activity predictions are performed by sending as input to a group activity classifier each clip representation learned at each scale.

* * * * *